April 30, 1940. T. A. RICH ET AL 2,199,247
HIGH FREQUENCY THERMOCOUPLE AMMETER
Filed Feb. 2, 1939
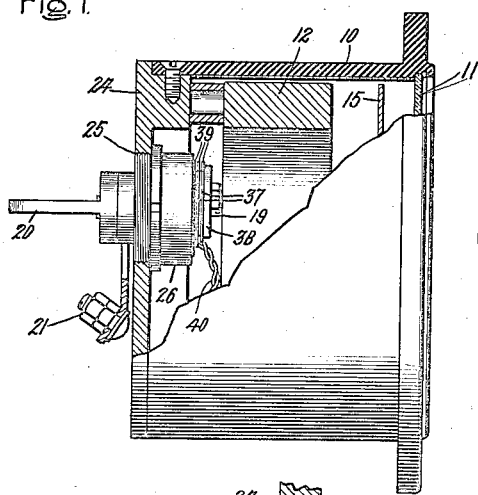
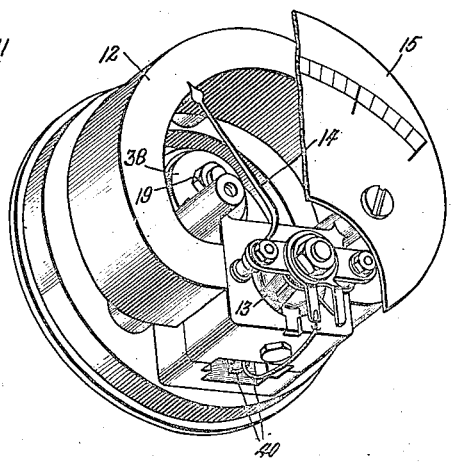
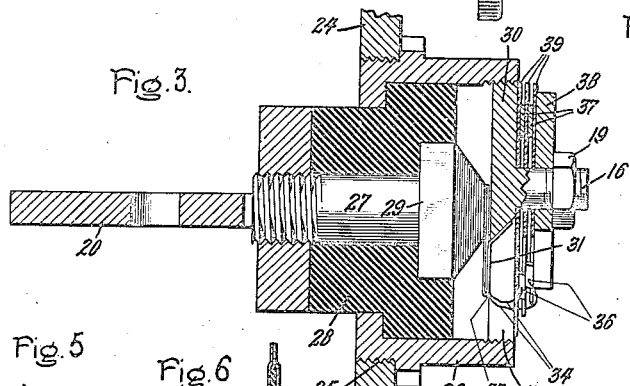
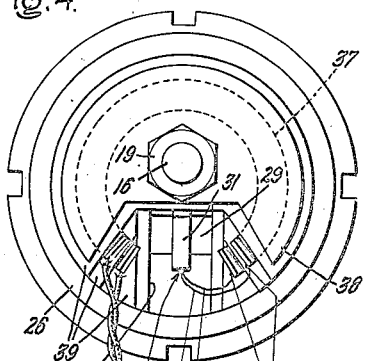
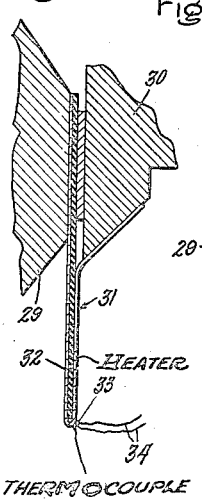
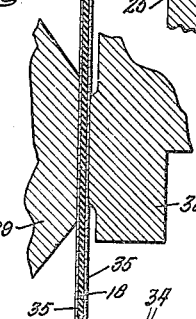
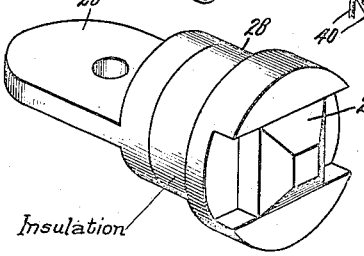
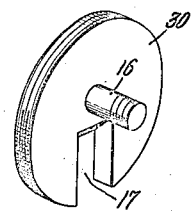
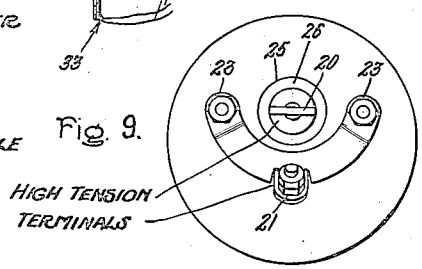
Inventors:
Theodore A. Rich;
Harry R. Meahl;
Philip C. Michel,
by Harry E. Dunham
Their Attorney.

UNITED STATES PATENT OFFICE 2,199,247

HIGH FREQUENCY THERMOCOUPLE AMMETER

Theodore A. Rich, Harry R. Meahl, and Philip C. Michel, Schenectady, N. Y., assignors to General Electric Company, a corporation of New York Application February 2, 1939, Serial No. 254,136

4 Claims. (Cl. 171—95)

Our invention relates to thermocouple instruments for measuring high frequency currents.

In such instruments difficulties are encountered because the high frequency currents in the leads to the heater element and the heater itself produce electromagnetic fields which impair the operation.

One object of our invention is to provide a high frequency thermocouple instrument in which the inductance in both the alternating current circuit and in the direct current circuits of the instrument are reduced to values such that they do not seriously influence the accuracy or impair the safety of the instrument.

Another object of our invention is to provide satisfactory inductive and electrostatic shielding between the direct and alternating current circuits of the instrument. Another object of our invention is to provide a high frequency heater element which is relatively free from skin effect. As a result of the accomplishment of the above mentioned objects, we have provided a high frequency thermocouple instrument which is relatively free from frequency and other errors and which has relatively low self-heating and hence is capable of safely measuring high frequency currents of appreciable magnitude.

The features of our invention which are believed to be novel and patentable will be pointed out in the claims appended hereto. For a better understanding of our invention, reference is made in the following description to the accompanying drawing in which Fig. 1 is a side view partially in section of our improved thermocouple instrument in its casing; Fig. 2 is a front perspective view of the instrument removed from the casing; Fig. 3 is a sectional side view of the heater and thermocouple unit and the alternating and direct current terminals; Fig. 4 is a front view of the part shown in Fig. 3; Fig. 5 is a greatly enlarged side view of the thermocouple heater construction; Fig. 6 is a modified form of thermocouple heater embodying our invention; Fig. 7 is a perspective view of the high alternating current terminal structure; Fig. 8 is a perspective view of the heater supporting cap; and Fig. 9 is a rear view of the device showing entrance to the concentric alternating current terminals.

In Fig. 1, 10 represents a cylindrical casing of insulating material having a back closure 24 of metal to which casing 10 is secured as indicated. The front of the casing is closed by a window 11. The casing contains in its forward portion a miniature direct current instrument having a permanent magnet field structure 12, moving coil armature 13 (see Fig. 2), pointer 14 and scale plate 15. This instrument is of usual construction and is supported from and grounded to the rear metallic wall part 24 in any suitable manner, and hence we need not describe this portion of the device in further detail, except to point out that its moving coil 13 is connected to the thermocouple hereinafter described through suitable non-inductive leads 40.

20 represents the "high" alternating current terminal and 21 represents the other alternating current terminal which, as shown in Figs. 1 and 9, is connected at points 23 to the back metal wall 24. Terminal 21 will also be connected to ground either through wall 24 or otherwise. Terminal 20 is threaded onto a bolt or central lead 27, the head 29 of which constitutes the heater support block. The heater element itself consists of a thin ribbon of metal 31 connected at one end to the forward tip of block 29 and at its other end to the metal supporting cap part 30 on their axes. This cap as shown by itself in Fig. 8 is of disk shape with a threaded periphery and has a bolt 16 extending forward from its center and has a radial slot 17 adjacent to which the heater 31 is positioned. Cap 30 is electrically connected with and screwed into the forward end of the cylindrical metal terminal part 26, and this in turn has its rear end threaded into the metal rear wall part 24 at a threaded opening 25 therein. Thus, the alternating current circuit between the A.-C. terminals and heater is completed. The A.-C. terminal parts are held in fixed insulated relation to the back wall 24 by being separated by a stepped plug of insulating material 28.

It is noted that the alternating current terminals and leads to the heater are concentrically and symmetrically arranged, thus reducing the A.-C. inductance of the circuit to a minimum. This is of importance because at high frequencies there would be considerable reactive drop in the A.-C. circuit if it had appreciable inductance. The field produced by this inductance causes losses in dielectrics and induces currents in metal bodies near it, or even more seriously produces a circulating current in the D.-C. circuit. In some instruments now satisfactorily used on lower frequencies these losses at ultra high frequencies will cause damage to the instrument as well as excessive errors. Also, it will be noted that the heater element 31 is doubled back on itself, the spaced radial parts thereof being separated by a thin strip of mica insulation 32 about .001 inch in thickness and hence the inductance in the heater strip is reduced to a minimum and the position of and connections to the heater in relation with the concentric terminals thereto is such that the heater portion of the A.-C. circuit is in keeping with a completely concentric A.-C. circuit. It is to be further noted that the heater is made of thin strip material, for example, .001 inch thickness, and this is of importance in reducing its skin effect or the tendency of very high frequency currents to flow on its surface. The current of whatever frequency thus has a tendency to flow more uniformly through the cross section of the heater element and thus the heating characteristics of the heater strip are little influenced by changes in frequency and its heating varies substantially in proportion to the magnitude of current flow therethrough which is the relation desired.

We prefer to make the heater in the form shown in Fig. 6. Here the spaced heater strips 35 are in the form of thin circular disks welded together at their peripheries and spaced apart by a thin disk 18 of insulation 18. With this arrangement, it is feasible to make the heater material even thinner than .001 of an inch and to provide an exactly concentric alternating current circuit construction. The heater strips or disks, as the case may be, may be made of platinum iridium alloy. The other parts of the A.-C. circuit may be made of brass. Where the heater contact is made to the brass, the latter may be silver plated and the connection made by welding. The heater is prevented from movement by some clamping action between the parts 29 and 30.

The dimensions of the concentric terminal unit are also of some importance. As at present advised, we prefer to make the outer diameter of the outer cylindrical terminal part 26 approximately ⅝ of an inch and the other dimensions in approximately the same relative proportions as has been illustrated. By keeping this unit small, the insulation used therein is kept at a minimum and is made of the highest quality. The dielectric loss and heating due thereto is thus kept at a minimum.

The hot junction of the thermocouple 34 is indicated at 33 (Figs. 3, 5 and 6) at the central point of the heater element furthest removed from the A.-C. terminals thereto. The cold junction of the thermocouple is made at point 36 of conductor rings 37 (see Figs. 3 and 4). The other ends of these rings connect to the D.-C. instrument through leads 40. The rings 37 insulated by disks 39 of insulation are clamped between cap 30 and a washer 38 by means of the bolt 16 and the nut 19 thereon. This arrangement maintains the cold junction conductors in good thermal contact and at substantially the same temperature as the metal parts 29 and 30.

It will be observed that the direct current circuit leaves the A.-C. circuit through the cutaway radial opening 17 in terminal cap 30. This cut-away area or opening is small so that the concentric arrangement of the conductors is not disturbed. Because of this the current being measured produces negligible field within the instrument. The D.-C. instrument circuit is, in effect, shielded both inductively and electrostatically from the high frequency circuit. Moreover, we maintain the D.-C. leads from the thermocouple hot junction to the D.-C. instrument terminals close together as noted so that there is little chance for the D.-C. circuit to enclose any high frequency field. As a result, a negligible amount of high frequency current flows or tends to flow in the D.-C. circuit and no heating error or interference is present.

To the extent to which we have reached perfection in eliminating all of the difficulties heretofore experienced with this type of instrument, the thermocouple current is proportional to the square of the A.-C. current and is independent of its frequency. The particular instrument described is suitable for measuring up to 5 amperes A.-C. current at frequencies up to 100 megacycles with acceptable accuracy. This instrument may be so used continuously without becoming too hot to burn out the thermocouple or otherwise damage the instrument.

What we claim as new and desire to secure by Letters Patent of the United States is:

1. High frequency current measuring apparatus comprising a pair of concentric alternating current terminals insulated from each other, the outer terminal having a radial slit therein, a heater element connected between said terminals, said heater element being connected to the two terminals on their central axis and consisting of sheet conducting material not substantially thicker than .001 inch, said material being doubled back on itself between its points of connection to said terminals and the adjacent parts separated by sheet insulation not substantially thicker than .001 inch, a thermocouple having its hot end in contact with the central portion of said heater, and extending through the radial slit in the outer concentric terminal, cold end terminals for said thermocouple in good thermal contact but electrically insulated from said concentric terminals, and a direct current measuring instrument connected to said thermocouple.

2. High frequency current measuring apparatus comprising an inner high frequency terminal and a grounded outer high frequency terminal concentric to the inner terminal and spaced therefrom by insulation, a metallic cap provided with a radial slit connected to and substantially closing one end of the outer terminal, a heater element connected between the adjacent end of the inner terminal and said cap on the axis of said terminals, said heater element being of thin metallic sheet material which extends outwardly radially from the inner terminal, is folded back on itself and then extends radially inwardly to the connection with said cap, the radial extending portions of said heater element being spaced apart by a thin layer of insulation, said heater material being sufficiently thin to minimize skin effects and its radial parts being sufficiently close together to minimize inductance when radio frequency currents flow therethrough to the end that the heating thereof will be primarily due to the resistance loss therein and largely independent of changes in frequency, a thermocouple having its hot end in contact with the central portion of said heater and extending through the radial slit in said cap, the cold end of said thermocouple being on the outer end of said cap electrically insulated therefrom but in good thermal contact therewith, and a direct current electrical measuring instrument connected across the cold end of said thermocouple, the leads from said thermocouple to said instrument being close together to minimize the pick-up of high frequency oscillations in the thermocouple circuit.

3. High frequency current measuring apparatus comprising a casing, the rear wall of which is of metal, a metallic cylinder secured into the rear wall of said casing and extending forward into the casing, a high frequency current terminal connected to said rear wall at diametrically symmetrical points on opposite sides of said cylinder, a second high frequency current terminal extending through the rear wall and forward into said casing on the axis of said cylinder, said metal parts forming concentric terminals and leads into the casing, a bushing of insulating material separating said concentric leads and insulating the inner terminal from the rear wall of said casing, a metal cap provided with a radial slit connected to and substantially closing the inner end of the cylinder in the casing, the forward end of the central lead terminating closely adjacent the central portion of said cap, a heater element having low skin effect and low inductance with respect to the passage of high frequency currents therethrough connected between the central lead and cap and enclosed by said cap within the cylinder, a thermocouple having its hot end on the heater element and extending forwardly through the radial slit in said cap, the cold end of said thermocouple being supported on the forward wall of said cap, electrically insulated therefrom and in good thermal contact therewith, and a direct current electrical measuring instrument in said casing connected to the thermocouple through non-inductive leads.

4. High frequency measuring apparatus as set forth in claim 3 in which the external diameter of the alternating current cylindrical lead is not greater than three-fourths of an inch.

THEODORE A. RICH.
HARRY R. MEAHL.
PHILIP C. MICHEL.